(No Model.)
H. C. F. STORMER.
AMALGAM WASHING APPARATUS.
No. 586,635.                     Patented July 20, 1897.
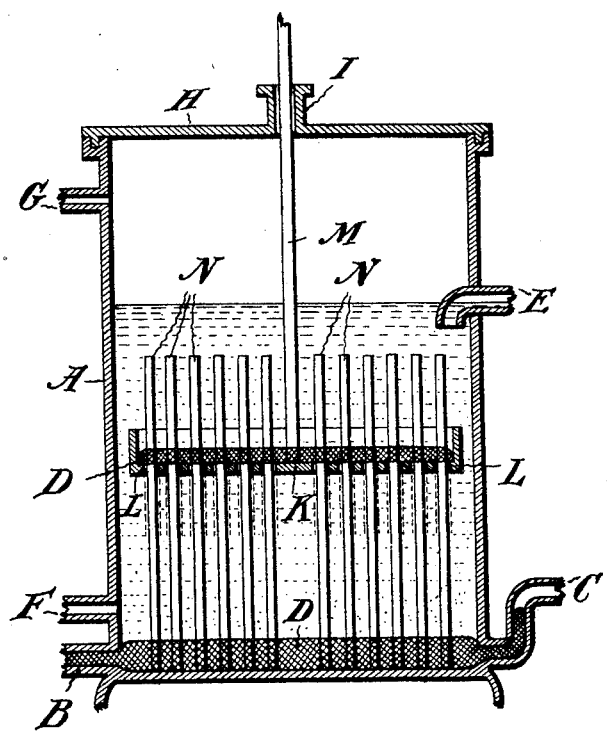
Witnesses:
Inventor:
Henrik C. F. Störmer.
By
Attorney

UNITED STATES PATENT OFFICE.

HENRIK CHRISTIAN FREDRIK STORMER, OF CHRISTIANIA, NORWAY.

AMALGAM-WASHING APPARATUS.

SPECIFICATION forming part of Letters Patent No. 586,635, dated July 20, 1897.

Application filed February 6, 1897. Serial No. 622,316. (No model.) Patented in Norway July 12, 1895, No. 4,697, and in England December 27, 1895, No. 24,837.

*To all whom it may concern:*

Be it known that I, HENRIK CHRISTIAN FREDRIK STORMER, a subject of the King of Sweden and Norway, residing at Christiania, in the Kingdom of Norway, have invented certain new and useful Improvements in Amalgam-Washing Apparatus, (for which patents have been obtained in England, No. 24,837, dated December 27, 1895, and in Norway, No. 4,697, dated July 12, 1895;) and I do hereby declare the following to be a full, clear, and exact description of my invention, such as will enable others skilled in the art to which it appertains to make and use the same, reference being had to the accompanying drawing, and to letters of reference marked thereon, which forms a part of this specification.

My invention relates to the extraction of alkali metals from electrically-formed alkali amalgams, and has for its object the rapid extraction of the alkali metal, so as to enable the reutilization of the mercury in the production of such amalgam; and it consists in exposing a very large surface of amalgam to the action of a solvent.

In order that my invention may be fully understood, I will now describe the same, reference being had to the accompanying drawing, which shows a section of an apparatus employed.

A is a suitable vessel not subject to the action of alkalies or of mercury, and B and C are inlet and outlet pipes, respectively, for the amalgam D.

E and F are the inlet and outlet pipes, respectively, for the liquid for dissolving the alkali metal, and G is an outlet for the gas due to the formation of the liquid alkali metal.

K is a vertically-reciprocating tray provided with perforations L, and which is secured to the end of a rod M, that passes through the stuffing-box I in the lid H of the vessel A. The rod M is connected to a suitable crank-shaft, cam, or eccentric (not shown) for imparting to it a reciprocating motion.

N are rods of carbon, glass, ebonite, or other material not acted upon by the contents of the chamber A which pass through the holes or perforations L in the reciprocating tray K, leaving sufficient space between the rods and sides of the holes for the mercury to run down. These rods, however, may be dispensed with, but the number of holes will then be increased and their size diminished.

I also arrange my apparatus in series, so as to increase the rapidity of dissolving the amalgam, and to this end I connect the outlet-pipes C and F of one apparatus with the inlet-pipes E and B of another, connecting in this manner as many vessels as will be desirable and arranging them in such a manner that each in succession may become the first of the series, so as to have the fresh solvent coming into contact with an amalgam comparatively poor in alkali, and they may all be worked from the same driving-shaft by a judicious arrangement of belt-pulleys and eccentrics or similar driving mechanism.

The operation is as follows: The vertically-reciprocating tray K dips into the amalgam at the bottom of the vessel A, said amalgam passing through the holes into the tray, and on the return stroke that amalgam drops therefrom through the solvent in the form of a fine rain when no rods N are used, or when they are used runs down the rods in a fine stream, thus exposing a very large thin surface of amalgam to the action of the dissolving liquid.

Having thus described my invention, what I claim as new therein, and desire to secure by Letters Patent, is—

1. A process for washing alkali amalgam, which consists in taking up the amalgam from a lower level, raising the same through a decomposing liquid to a higher level and simultaneously therewith subdividing the amalgam into streams and allowing said streams to flow through the solvent liquid, for the purpose set forth.

2. A method for extracting the alkali metal from an amalgam thereof, which consists in subjecting streams of amalgam in tubulous form to the action of a dissolving liquid, substantially as described.

3. A method of extracting the alkali metal from an amalgam thereof, which consists in causing tubulous streams of amalgam, formed around a solid core, to flow through a solvent, substantially as described.

4. An apparatus for the extraction of alkali metal from amalgams thereof, consisting of a suitable vessel having inlets for amalgam and a dissolving liquid and outlets therefor and for gas, in combination with a body of amalgam therein and a solvent, a perforated tray adapted to lift a portion of amalgam from the bottom of the vessel and divide it into a series of fine streams when being raised, and means for reciprocating said tray, substantially as set forth.

5. In an apparatus for the extraction of alkali metal from amalgams thereof, the combination with a suitable vessel having amalgam and a solvent therein, of a perforated tray adapted to be forced below the surface of the amalgam in the vessel and divide said amalgam into a number of fine streams when the tray is lifted, and means for reciprocating said tray, substantially as described.

6. An apparatus for the extraction of alkali metal from amalgams thereof consisting of a vessel adapted to contain a body of amalgam and a supernatant liquid solvent, in combination with a tray adapted to receive a reciprocating motion into and out of the body of amalgam through said liquid solvent, and means for causing the amalgam taken up by the tray to flow into and through the liquid solvent in streams while said tray is moving through such liquid, substantially as described.

7. In an apparatus for the extraction of alkali metal from amalgams thereof, a suitable vessel, an amalgam and a solvent therein, in combination with a perforated tray and means for reciprocating said tray and a series of stationary rods passing through said perforations, for the purpose set forth.

8. In an apparatus for the extraction of alkali metal from amalgams thereof, a suitable vessel, an amalgam and a solvent therein, in combination with a perforated tray and means for reciprocating said tray and a series of rods secured to the bottom of said vessel and passing through said perforations, for the purpose set forth.

In witness whereof I have hereunto set my hand in presence of two witnesses.

HENRIK CHRISTIAN FREDRIK STORMER.

Witnesses:
   JOB VAALER,
   E. N. RÖNNEBERG.